May 20, 1952 — M. R. CALDWELL — 2,597,288
CONTROLLED FISHING FLOAT
Filed July 25, 1947
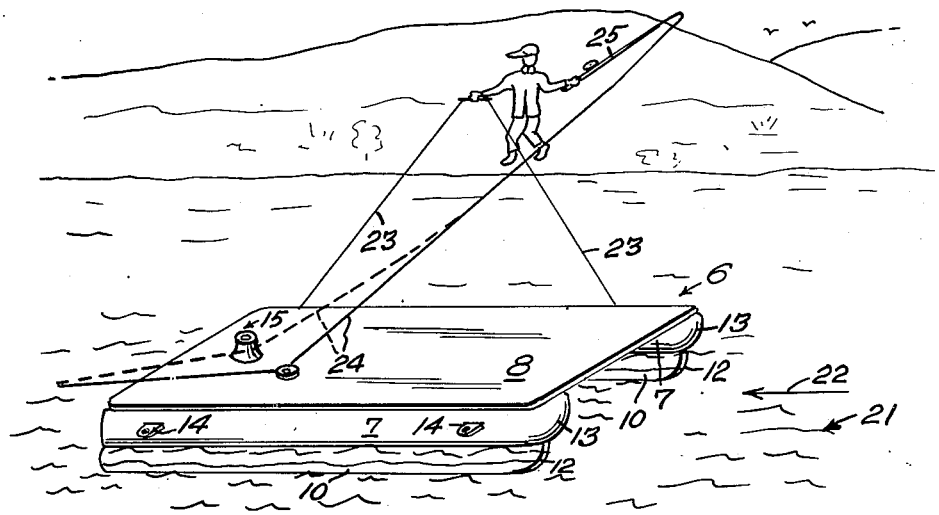
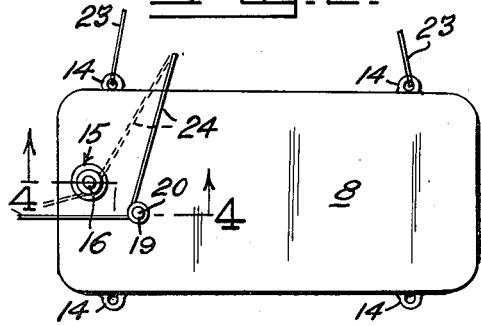
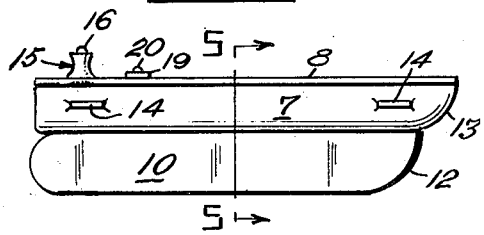
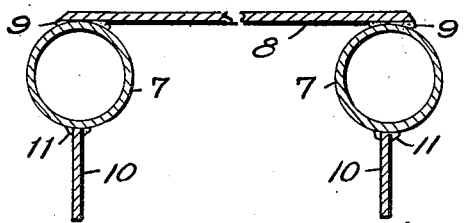
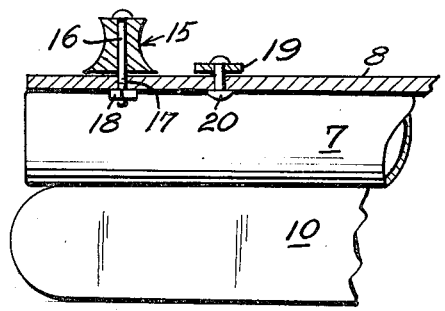
Inventor
Milford R Caldwell
By Randolph & Beavers
Attorneys Patented May 20, 1952

2,597,288

UNITED STATES PATENT OFFICE 2,597,288

CONTROLLED FISHING FLOAT

Milford R. Caldwell, Los Molinos, Calif.

Application July 25, 1947, Serial No. 763,487

1 Claim. (Cl. 43—43.13)

This invention relates to a controlled float for use in fishing rivers or streams and which is especially adapted for use in localities where the waters to be fished are inaccessible for wading.

More particularly, it is a primary object of the present invention to provide a controlled float adapted to be actuated by the current in a stream or river and to be regulated or controlled by the user from one bank thereof for conveying the end of a fishing line, carrying the usual lure, bait, spreader leader and sinker to a position away from the bank of the body of water occupied by the fisherman and so that the lure or bait may be disposed at any desired distance from the banks of the stream or river.

Still another object of the invention is to provide a controlled float having means for initially holding a portion of the fishing line while the float is being maneuvered to a desired position relatively to the banks of a stream or river and having other means for thereafter engaging the fishing line and in a manner to permit free operation of the line by the fisherman.

Still a further object of the invention is to provide a controlled float from which the fishing line can be completely disengaged after the bait or lure is struck by a fish and so that the conventional fishing gear can be utilized in a conventional manner in landing the catch.

Various other objects and advantages of the invention will hereinafter become more fully apparent from the following description of the drawing, illustrating a preferred embodiment thereof, and wherein:

Figure 1 is a perspective view showing the controlled float in an operative position in a stream or river or other body of water containing a current;

Figure 2 is a top plan view of the float;

Figure 3 is a side elevational view thereof;

Figure 4 is an enlarged vertical sectional view taken substantially along a plane as indicated by the line 4—4 of Figure 2, and Figure 5 is a cross sectional view taken substantially along a plane as indicated by the line 5—5 of Figure 3.

Referring more specifically to the drawing, the controlled float in its entirety is designated generally 6 and includes a pair of elongated pontoons 7 which are connected in spaced, substantially parallel relationship by means of a platform or deck 8 of approximately the same length as the pontoons 7 and which is suitably secured as by means of soldering or welding, as seen at 9 in Figure 5, along its longitudinal side edges to the upper portions of the pontoons 7.

The pontoons 7 may be formed of tubes of any suitable material having closed ends, such as aluminum and the deck 8 may likewise be formed of any suitable material such as a sheet of aluminum. Obviously, the pontoons and deck may be made of various lengths, preferably about two feet and the width of the deck and spacing between the pontoons may vary; the width of the deck preferably being approximately one-half its length.

As best seen in Figures 3, 4 and 5, each of the pontoons 7 is provided with a keel 10 comprising an elongated, substantially flat plate or bar, one longitudinal edge of which is secured to the underside of the pontoon 7 and perpendicular thereto, as by means of soldering or welding, as seen at 11. The keels 10 are of a length to extend substantially the length of the pontoons 7 and the forward ends of said keels are rounded, as seen at 12, as are also the closed, forward ends 13 of the pontoons 7. Each of the pontoons 7 is provided, adjacent each end thereof, with an outwardly projecting apertured bracket or attaching eye 14, for a purpose which will hereinafter become apparent.

The deck 8, adjacent its aft end and intermediate of its side edges is provided with an upstanding spool 15 which is journalled on the shank of a headed bolt 16 which extends downwardly through an axial bore thereof and through an opening 17 in the deck 8. A nut 18 engages the threaded shank portion of the bolt 16 which protrudes below the deck 8 for detachably retaining the parts in their assembled relationship as illustrated. As best seen in Figure 4, the spool 15 is externally grooved intermediate of its ends and is of substantially greater diameter at its lower end than at its upper end and at least said lower end thereof is flat to engage substantially flush against the upper side of the deck 8 for a purpose which will hereinafter become apparent.

A washer 19, preferably formed of leather and which is relatively rigid is connected to the deck 8 by a rivet or other fastening 20 and is disposed thereabove and spaced slightly therefrom.

The line attaching eyes 14 on either of the pontoons 7 may be utilized, depending upon the side of the stream from which the float 6 is to be launched and the direction of the current in the stream or body of water. Referring to Figure 1, assuming that the fisherman is standing on the left bank of a stream or river 21, the flow of which is from right to left of Figure 1, or as indicated by the arrow 22, under such circumstances, a controlling line 23 would be attached to each of the attaching eyes 14 of the port pontoon 7 and the opposite ends of the lines 23 would be held by the fisherman on the bank. A part of a fishing line 24, attached to a conventional rod and reel 25 held by the fisherman, would be clamped between a portion of the washer 19 and the part of the deck 8 disposed therebeneath and so that the lure or bait, sinker, spreader and other gear, not shown, would be on the end of the line extending from the aft end of the float 6, as seen in Figure 1. The fishermen would then launch the float 6 and by manipulating the lines 23 so that the bow end of the float would be directed up-stream and toward the opposite bank, the current striking the port sides of the keels 10 will cause the float to move toward the other bank of the stream and in an up-stream direction. When the float 6 has thus been propelled a sufficient distance toward the center of the stream or river 21, the lines 23 can be adjusted manually so that the current will retain the float in a desired position, after which the lines 23, as just suggested, may be anchored to any suitable means on the bank. A light snap or jerk on the line 24 will disengage it from the washer 19 and will cause the line to move into engagement with the spool 15, as indicated in dotted lines in Figures 1 and 2. As the bottom of the spool is resting substantially flush on the deck 8, the line 24 will slide up the inclined annular surface of the spool to the intermediate, smallest portion or groove thereof, and it will be readily obvious that when thus disposed, the line may be payed out or reeled in, as desired by the fisherman, by conventional operation of the rod and reel 25 affording substantially the same free operation of the line as would be accomplished without the float 6, except that the spool 15 will function to hold the line away from the bank on which the fisherman is standing. When the bait or lure is struck by a fish, the pull exerted on the line will readily permit its disengagement from the spool 15 and so that the rod and reel may then be utilized in a conventional manner in landing the fish.

Various modifications and changes are contemplated and may obviously be resorted to, without departing from the spirit or scope of the invention, as hereinafter defined by the appended claim.

I claim as my invention:

A fishing float comprising pontoons and a flat deck supported on the pontoons, said deck having at the longitudinal axis thereof adjacent the rear end of the deck a shaft perpendicular to and on the deck and a pulley rotatably mounted on the shaft, a rivet perpendicular to the deck positioned in spaced relationship to and forwardly of the pulley and laterally of the outer surface of the pulley and a disc held by the rivet in slightly spaced relation from the upper surface of the deck, said pulley and disc having no other means for holding them in spaced relation from each other, there being two or more securing means along the deck whereby a controlling line means for manipulation by the operator may be secured to the deck, said disc constituting a releasable clamp for a fishing line manipulatable by the operator, said pulley being of greater height than said disc, whereby manipulation of the fishing line by the operator will cause release of the fishing line from its position between the disc and the deck to a position engaging the pulley, said controlling line means enabling the operator to simultaneously or at some other time change the direction of the movement of the float.

MILFORD R. CALDWELL.

REFERENCES CITED

The following references are of record in the file of this patent:

UNITED STATES PATENTS

| Number | Name | Date |
|---|---|---|
| 105,240 | Paget | July 12, 1870 |
| 237,262 | Estep | Feb. 1, 1881 |
| 780,029 | Flegle | Jan. 17, 1905 |
| 809,965 | Lystne | Jan. 16, 1906 |
| 944,209 | Reed | Dec. 21, 1909 |
| 1,304,983 | Howerton | May 27, 1919 |
| 1,642,582 | Hansen | Sept. 13, 1927 |
| 1,752,630 | Brown | Apr. 1, 1930 |
| 1,859,557 | Edgar | May 24, 1932 |
| 2,103,630 | Morin | Dec. 28, 1937 |